(12) United States Patent
Kaufmann et al.

(10) Patent No.: US 10,245,541 B2
(45) Date of Patent: Apr. 2, 2019

(54) AIR FILTER SYSTEM, AIR FILTER ELEMENT AND METHOD FOR EXCHANGING AN AIR FILTER ELEMENT

(71) Applicant: MANN+HUMMEL GMBH, Ludwigsburg (DE)

(72) Inventors: Michael Kaufmann, Meckenheim (DE); Klaus-Dieter Ruhland, Meckenheim (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 240 days.

(21) Appl. No.: 15/174,331

(22) Filed: Jun. 6, 2016

(65) Prior Publication Data

US 2016/0279554 A1    Sep. 29, 2016

Related U.S. Application Data

(63) Continuation of application No. 14/107,831, filed on Dec. 16, 2013, now Pat. No. 9,358,489, which is a (Continued)

(30) Foreign Application Priority Data

Jun. 15, 2011    (DE) .................. 10 2011 106 502

(51) Int. Cl.
*B01D 46/00* (2006.01)
*B01D 46/24* (2006.01)
*B01D 46/10* (2006.01)

(52) U.S. Cl.
CPC ..... *B01D 46/0005* (2013.01); *B01D 46/0002* (2013.01); *B01D 46/0004* (2013.01); *B01D 46/0019* (2013.01); *B01D 46/0023* (2013.01); *B01D 46/106* (2013.01); *B01D 46/2414* (2013.01); *B01D 2265/024* (2013.01); *B01D 2265/028* (2013.01); *B01D 2267/00* (2013.01); *B01D 2267/40* (2013.01); *B01D 2271/027* (2013.01); *Y10T 29/4973* (2015.01)

(58) Field of Classification Search
CPC ........... B01D 46/0002; B01D 46/0004; B01D 46/0005; B01D 46/2411; B01D 46/2414; B01D 2271/027; B01D 2201/291; B01D 2201/34; B01D 2201/347; F02M 35/0201; F02M 35/02416; F02M 35/02483
See application file for complete search history.

(56) References Cited

U.S. PATENT DOCUMENTS 5,487,767 A * 1/1996 Brown ............... B01D 46/0024
55/357
5,730,769 A * 3/1998 Dungs ................ B01D 46/0024
123/198 E

* cited by examiner

Primary Examiner — Robert Clemente
(74) Attorney, Agent, or Firm — James Hasselbeck

(57) ABSTRACT

A filter (1) for filtering air, in particular an air filtering element (30), is provided for releasably fitting into a housing (10) which has a housing upper part (11) and in particular a central tube (20) fastened to the housing upper part (11), and also the housing for the filtering element (30) is provided. The filtering element has a seal (33, 34) for holding the filtering element (1) on the housing upper part (11) and central tube (20) and for sealing the space (111) between the filtering element (30) and housing upper part (11) when the filtering element (30) is releasably fitted in the housing (10). The seal (33, 34) is connectable in a form-fitting manner to a sealing receptacle (111) of the housing upper part (11) and/or of the central tube (20).

12 Claims, 4 Drawing Sheets

Related U.S. Application Data continuation of application No. PCT/EP2012/061354, filed on Jun. 14, 2012.

AIR FILTER SYSTEM, AIR FILTER ELEMENT AND METHOD FOR EXCHANGING AN AIR FILTER ELEMENT

CROSS REFERENCE TO RELATED APPLICATIONS

This application is a continuation of U.S. patent application Ser. No. 14/107,831 filed Dec. 16, 2014, which is a continuation of international application No. PCT/EP2012/061354 having an international filing date of Jun. 14, 2012 and designating the United States, the international application claiming a priority date of Jun. 15, 2011, based on prior filed German patent application No. 10 2011 106 502.8, the entire contents of the aforesaid international application and the aforesaid German patent application being incorporated herein by reference.

TECHNICAL FIELD

The present invention relates to a filter element which can be used for filtering air as well as to a housing for the filter element. The invention relates in particular to an air filter element, the housing for the air filter element and a filter assembly.

Filter elements are used for the filtration of fluid flows or gaseous media. They are, for example, used for the filtration of an air flow which is directed into a passenger compartment of a motor vehicle. In this connection, an air condition installed in the motor vehicle is in particular used to clean the outside air with regard to harmful substances, odors, etc. contained therein. Appropriate filters or cabin filters are in this context for example particle filters, odor filters or a combination thereof.

Furthermore, it is necessary to clean the air, which is directed to an internal combustion engine, from suspended particles. Such air filters, for example for trucks, construction machines, agricultural machines or even marine engines have to be designed in a reliable and robust manner, for they can be exposed to extreme mechanical loads during operation.

Normally, filters have a housing with a housing upper part, wherein the housing can be installed in an exchangeable filter element. Normally, the filter element has a tubular design and is frictionally engaged in the housing by means of a seal.

BACKGROUND

DE 20 2007 004 475 U1 discloses a filter assembly in which a filter holder features at least one through-hole which serves to sealingly accommodate a filter element with an adapter collar.

For example foam made of polyurethanes (PU), also called PU foam, may be used as seal between housing or housing cover and filter element. Such foam made of polyurethanes, however, tends to relax after heat storage or due to exposure to high temperatures or temperature change.

In other words, the foam made of polyurethanes is force-free after heat storage, having lost elasticity. With filter elements frictionally engaged in the housing this is often the reason why greater critical movements between the individual parts occur with vibration excitation of the assembly from the parts housing with housing upper part, seal, and filter element. Such a vibration excitation can, for example, may occur during the operation of a motor vehicle into which the filter is installed.

SUMMARY

An objective of the present invention is to develop an improved air filter system, an improved air filter element, and an improved method for exchanging an air filter element.

Accordingly, the air filter system serves in particular for the intake air of internal combustion engines and comprises a housing and at least one air filter element for filtering air. The housing comprises a housing upper part with a clean air connection for discharging clean air cleaned in the air filter element from the housing and a sealing receptacle for a form-fitting connection with a cylindrical, in particular radially acting seal of the air filter element and for holding the air filter element. The sealing receptacle features a cylindrical, from the housing upper part into the interior space of the housing extending sealing surface which encloses the clean air connection and to which the seal of the air filter element can be applied, wherein at the sealing surface an annular projection protruding radially over the sealing surface is disposed which can be enclosed by the seal of the air filter element in a form-fitting manner.

The design of the sealing receptacle and of the seal guarantees in particular that the seal between housing and filter element does not become force-free during heat storage.

Advantageously due to the form fit, the filter element is securely held at the sealing receptacle without axial tension and cannot drop out of the receptacle. The seal and/or the housing shape or the sealing receptacle is, for example, designed in such a way that the form fit firmly and tightly holds the weight of the filter element loaded with particles.

The cylindrical shape of the sealing surface can preferably be designed as circular cylinder, elliptic cylinder or oval cylinder. The shape preferably forms the outer circumference of the air filter element. However, a polygonal, in particular rectangular shape can be chosen.

The air filter element is preferably designed as round filter element which comprises a zigzag folded, closed annular filter bellows that encloses a central interior space. The filter bellows is sealed on its axial ends by end disks, wherein one end disk features a central annular inlet or outlet opening at which a seal for separating raw from clean side is disposed. However, the air filter element can also feature two zigzag folded, closed annular filter bellows which are arranged one inside the other and connected with each other in such a way that one filter bellows can be radially flowed through from the outside to the inside and the other filter bellows can be radially flowed through from the inside to the outside. An air filter element with channels extending in flow direction is also conceivable which are formed by the fact that one smooth filter media layer and one undulated filter media layer are alternately placed on top of each other and that the channels formed therebetween are alternately closed.

As filter medium, a flat, porous filter medium can be used in each case, for example individual layers or combinations of cellulose media, glass fiber media, fleeces made of melt-blown or spun synthetic fibers.

In one embodiment, a through-flowable central tube is disposed in the housing in particular coaxially to and in continuation of the clean air connection for radially supporting the air filter element, wherein the central tube is either detachably installable into the housing or made in one piece with the housing upper part of the housing. Due to the arrangement of the central tube at the housing, a reliable support of the filter bellows in operation can be ensured without providing a means for support in the exchangeable filter element. This makes it possible to create a lighter and less expensive design of the filter element. Furthermore, a possibly existing secondary element disposed in the central tube is protected by the central tube against mechanical damages when the main filter element is installed or removed.

It is advantageous if the central tube is designed in such a way that a seal of the filter element is detachably attachable by interlocking at the central tube and/or that the central tube is detachably attachable by interlocking at the housing upper part.

In one embodiment, the annular projection protruding radially over the sealing surface is formed by an annular extending central tube collar which is firmly connected with the central tube, in particular made in one piece and/or in particular abutting the sealing surface. In this way, the undercut formed by the projection protruding over the sealing surface may be easily formed or manufactured. Furthermore, with an unchanged housing, different variations of the air filter element and central tube are possible, for example, by varying the length of central tube, air filter element and housing lower part mountable on the housing upper part different air filter systems with different filter surfaces can be realized with unchanged housing upper part.

In one embodiment, the sealing surface is formed radially outside or inside at a cylindrical collar projecting from the housing upper part into the interior space of the housing.

In one embodiment, the sealing receptacle is formed by an annular recess or groove in the housing enclosing the clean air connection, in particular in the housing upper part.

In one embodiment, the sealing surface is formed by a cylindrical, radial inner or outer wall of the recess or groove.

In one embodiment, the central tube is designed in such a way that a seal of the air filter element is detachably attachable to the central tube by interlocking. This can, for example, be realized by the fact that the seal of the filter element features an undercut in the shape of a radial annular groove which corresponds to the shape of the projection of the housing upper part or the central tube. For example, the undercut can be designed in such a way that the surface of the undercut is spaced apart from the projection when the filter element is installed in the housing. However, the undercut can, for example, also be designed in such a way that the surface of the undercut abuts the projection in a force-free manner or with a slight tensioning when the filter element is installed in the housing.

Preferably when installing the seal of the filter element, the seal is pushed over the projection and thereby radially tensioned and elastically deformed, and may form the undercut. Once the sealing surface of the seal exceeds the projection, it radially abuts the corresponding sealing surface of the housing. If an undercut is provided in the seal of the filter element, the projection engages into the undercut and thus realizes a form fit in an insertion direction between housing and filter element. However, the form fit can also be realized without the undercut, the projection at the housing permanently deforming the seal of the filter element when installed in such a way that a corresponding undercut is formed in the seal.

The central tube can also be detachably attachable by interlocking to the housing upper part.

The annular projection can form a closed ring or be interrupted regularly or irregularly.

In one embodiment, this comprises a main filter element and a secondary filter element, which is disposed downstream of the main filter element in flow direction of the air, wherein the main filter element is attachable on the outside of the central tube and the secondary filter element on the inside of the central tube when the air filter elements are detachably installed in the housing.

In one embodiment, the main filter element features a seal for holding the main filter element at the housing upper part and/or at the central tube as well as for sealing the space between main element and housing upper part when the main filter element is detachably installed in the housing, and the secondary filter element features a seal for holding the secondary filter element at the housing upper part and/or at the central tube as well as for sealing the space between secondary element and housing upper part when the secondary filter element is detachably installed in the housing. Preferably, both seals and their corresponding sealing surfaces and sealing receptacles feature a configuration according to the invention.

Preferably, a radially outwardly facing sealing surface, in particular for the main filter element, with a radially outwardly facing projection protruding over the sealing surface is provided at the housing.

Preferably, a radially inwardly facing sealing surface, in particular for the secondary filter element, with a radially inwardly facing projection protruding over the sealing surface is provided at the housing.

The invention relates furthermore to an air filter element for a detachable installation into a housing of an air filter system in particular according to the invention, wherein the air filter element comprises a seal for holding the air filter element at the housing and for sealing a space between the air filter element and the housing upper part when the air filter element is detachably installed in the housing, wherein the seal can be connected with the sealing receptacle of the housing upper part in a form-fitting manner.

The form fit is preferably realized in radial direction, specifically one part of the one component, preferably of the housing, engages radially into the other part, preferably the air filter element. A form-fitting connection is thereby realized which substantially resists axial movement of the filter element out of the seal seat, making removal more difficult.

The filter element is preferably an air filter element, for example for filtering combustion air of an internal combustion engine. However, the invention can also be used for all liquid filters, for example oil filters or fuel filters.

The proposed filter element is of easy construction and can be manufactured at low costs. At the same time; the design of the seal ensures that the seal between housing and filter element does not become force-free even with heat storage.

Due to the form fit, the filter element furthermore remains attached to the sealing receptacle without tensioning and cannot drop out. The seal and/or the housing shape or the sealing receptacle is, for example, designed in such a way that the form fit holds a weight of the filter element loaded with particles.

In embodiments of the filter element, the same is exclusively insertably connectable with a housing or the sealing receptacle. This simplifies installation and/or removal and avoids time-consuming bayonet or screw connections.

Preferably, the seal is designed in such a way that the filter element is detachably attachable to the central tube by interlocking. Thus, a particularly stable and fluid-tight connection can be realized even with oscillations or vibrations of the filter element and/or the housing.

In one embodiment, the seal forms an undercut into which protrudes the annular projection radially when the air filter element is detachably installed in the housing. The undercut may be formed by elastic compression of the seal by the annular projection.

In one embodiment, the seal is designed in such a way that the filter element is detachably attachable to the housing upper part and/or to the central tube by interlocking, wherein in particular the interlocking of the filter element at the housing upper part and/or at the central tube creates a haptic perception during the detachable installation of the filter element. The ability to handle the filter element is thereby improved, for it becomes perceivable whether the filter element has been correctly and sealingly mounted.

In one embodiment, the seal of the filter element features an undercut in the shape of a radial annular groove which corresponds in particular to the shape of the projection of the housing upper part or the central tube. For example, the undercut can be designed in such a way that the surface of the undercut is spaced apart from the projection when the filter element is installed in the housing. However, the undercut can, for example, also be designed in such a way that the surface of the undercut abuts the projection in a force-free manner or with a slight tensioning when the filter element is installed in the housing.

The seal is preferably made at least partially of a casting compound, for example of a foamed PUR material. In particular the seal and/or the materials of the filter element or the housing are designed for operating temperatures between −30° C. and 90° C. The seal is preferably made of the same material in one piece with an end disk. Even furthermore, the end disk is preferably made of the casting compound and is sealingly connected with the filter bellows during casting.

Furthermore, the seal can feature at least one stiffening element for stiffening the seal.

In one embodiment, the seal has an inside sealing line on the interior side of the main filter element and a sealing web exterior side. Preferably, the seal has on the sealing web exterior side a plurality of notches which are disposed side by side along the circumference of the sealing web.

With the seals according to the invention, the exterior side of the sealing web is meant to generate a contact pressure to the in particular radially inside disposed sealing surface when the filter element is being mounted or is mounted in the housing. The exterior side of the sealing web is thereby preferably radially supported at, for example, an annular surface of the sealing receptacle. If such notches are provided, they reduce the pressure or mechanical resistance which is perceivable when mounting the filter element.

The invention relates furthermore to a method for exchanging an air filter element in an air filter system according to the invention in which the housing is opened, in particular by loosening a housing lower part from the housing upper part, subsequently an air filter element in particular according to the invention is removed from the housing and further subsequently an air filter element in particular according to the invention is mounted into the housing in such a way that the seal is connected with the sealing receptacle of the housing upper part in a form-fitting manner.

When installing the seal of the filter element it will preferably first of all be pushed over the projection and thereby radially tensioned and elastically deformed. Once the sealing surface of the seal has exceeded the projection, it then abuts radially the corresponding sealing surface of the housing. If an undercut is provided in the seal of the filter element, the projection engages into the undercut and thus realizes a form fit in insertion direction between housing and filter element. However, the form fit can also be realized without undercut if the projection at the housing permanently deforms the seal of the installed filter element in such a way that a corresponding undercut is formed in the seal.

With the described filter element, a form fit in the seal with respect to the housing is realized which has the advantage that the seal is kept in position even after aging or after high temperature impact or temperature change. Therefore, even at high oscillation loads which can, for example, occur during operation of a motor vehicle, critical movements between the individual components housing, seal and filter element are avoided.

The described interlocking of seal and central tube is realized by a special design of seal and central tube and generates therefore the form fit in the seal. The advantage of form fit is that the user receives a haptic feedback when mounting the filter element into the housing which is generated by snapping in of the form fits.

Another advantage of the described form fit in the seal is that the filter element cannot drop out of the housing, for example by the gravitational force, even if the housing has been opened for dismounting the filter element.

Further possible implementations of the invention comprise also not explicitly mentioned combinations of characteristics described previously or in the following with respect to the examples of an embodiment. In this context, the person of skill in the art will add also individual aspects as improvements or complements to the respective basic form of the invention.

Further embodiments of the invention are subject of the subclaims as well as of the examples of an embodiment of the invention described in the following. Furthermore, the invention is explained in detail based on examples of an embodiment with reference to the attached figures.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
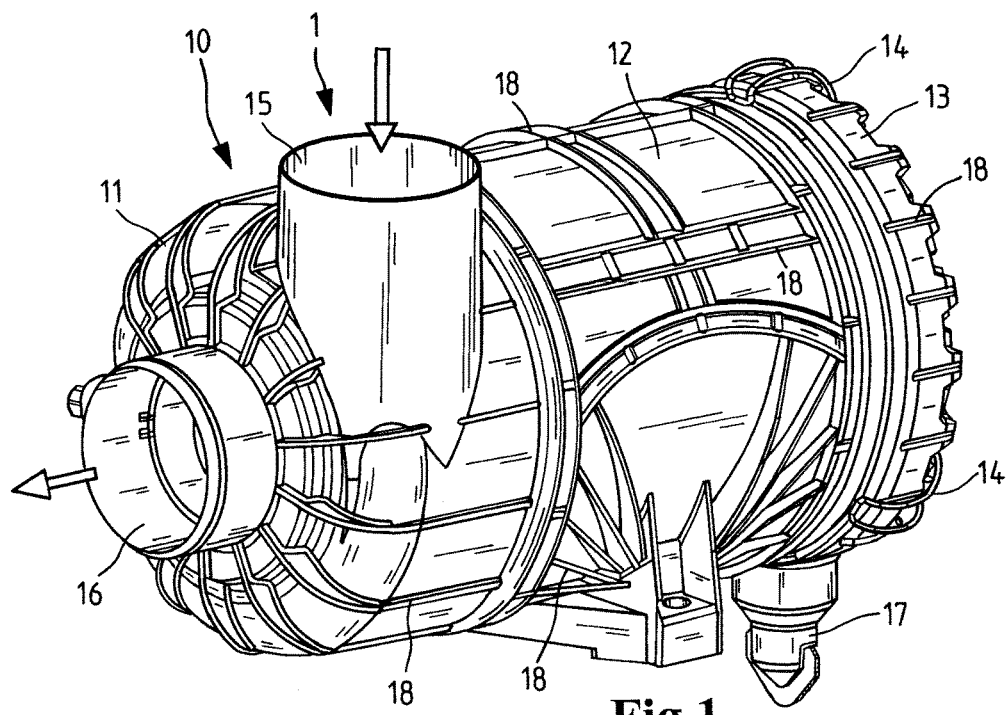
FIG. 1 is a three-dimensional view of an air filter according to one of the first examples of an embodiment.

In the Figures, the same reference numerals denote identical or similar components, unless otherwise stated. Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

In the following, the invention is described by means of a filter for the combustion air of an internal combustion engine such as, for example, a motor vehicle. Instead of filtering air, suitable filter elements can be designed, for example, for filtering another gaseous or liquid medium such as, for example, oil.

As shown in FIG. 1, the filter 1 comprises according to the first example of an embodiment a housing with a housing upper part 11 which is connected with a housing lower part 13 via a housing casing 12. The housing 10 in FIG. 1 is also a tripartite housing 10. The housing lower part 13 is held by means of clamps 14 at the housing casing 12. At the housing upper part 11 is disposed a raw air connection 15 with which raw air, unfiltered air, can be supplied into the housing 10 in the flow direction shown by the vertical block arrow. At the housing upper part 11 is also disposed a clean air connection 16 with which clean air, air cleaned from impurities, can be discharged from the housing 10 in the flow direction shown by the white block arrow. At the housing casing 12 or the housing lower part 13 is disposed a discharge valve 17 with which particles, that were contained in the raw air, can be discharged from the housing 10. A cyclone filtration is, for example, disposed upstream. The housing 10 has several ribs 18 at the housing upper part 11, the housing casing 12 and the housing lower part 13 which are, for example, meant to stiffen the housing 10 or the housing upper part 11, the housing casing 12 or the housing lower part 13. To provide a clear overview, not all ribs 18 in FIG. 1 are provided with a reference numeral.

Figure 2:
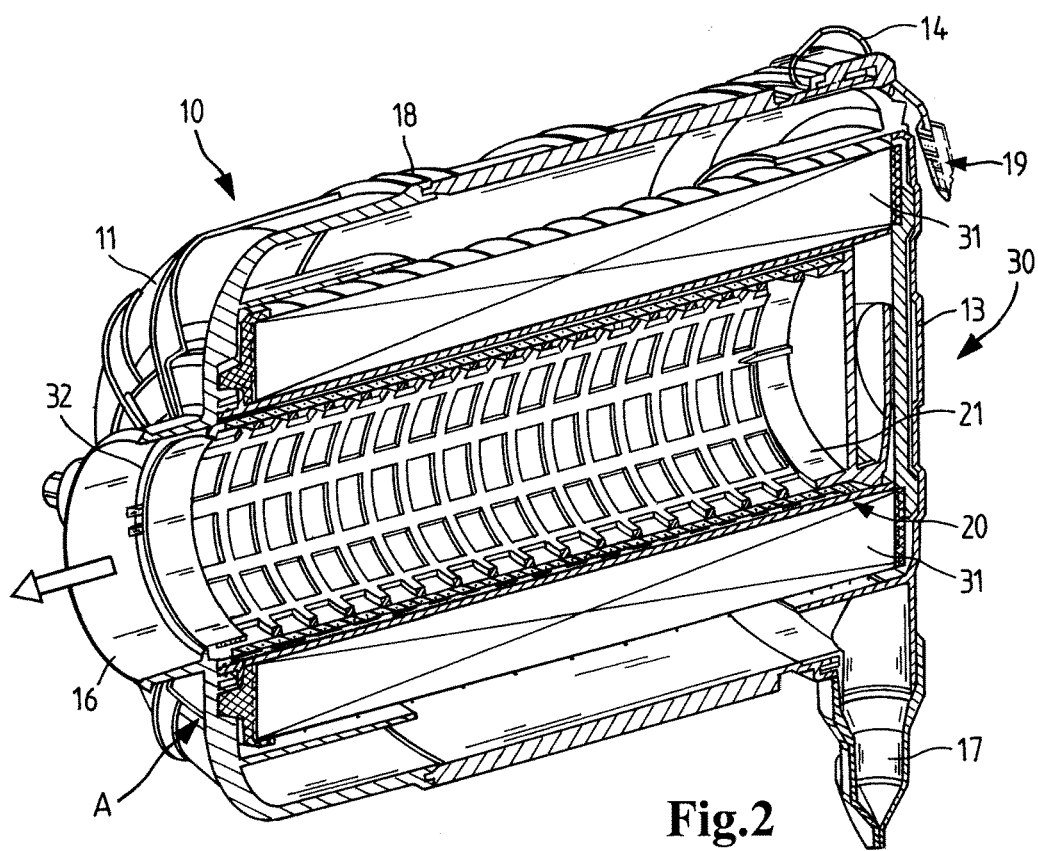
FIG. 2 is a sectional view of the air filter in FIG. 1 into which a filter element is detachably installed according to the first example of an embodiment.

FIG. 2 shows a section through the housing 10 when a filter element 30 for filtering air is installed therein. The filter element 30 comprises a main element 31 and a secondary element 32 which can be mounted in the housing 10 independent of each other. The main element 31 is meant to filter first predetermined impurities from the air such as, for example, coarse dust. The secondary element 32 is meant to filter second predetermined impurities from the air such as, for example, fine dust. The secondary element 32 is disposed downstream of the main element 31 in flow direction of the air, as can be seen by the block arrows in FIG. 1 and FIG. 2.

A clamped bracket 19 of a clamp 14 can be recognized in FIG. 2 in order to connect the housing parts 12, 13 with each other. The housing 10 has furthermore a first central tube 20 at which the tubular main element 31 of the filter element 30 is disposed. The housing 10 has moreover a second central tube 21 at which the annular secondary element 32 of the filter element is disposed. The second central tube 21 has a grid-shaped pipe wall and is fluid-permeable. The first central tube 20 has also a grid-shaped pipe wall and is fluid-permeable, even if this cannot be clearly seen in FIG. 2. The first central tube is attached to the housing 10, more precisely to its housing upper part 11. This attachment of the first central tube 20 is realized by interlocking the first central tube 20 to the housing 10, more precisely to its housing upper part 11. The second central tube 21 can also be attached to the housing 10, more precisely to its housing upper part 11. The attachment of the central tubes 20, 21 as well as of the filter element 30 is described later in detail with regard to FIG. 3 to FIG. 5 which depict each in detail an area in FIG. 2 identified by an arrow A.

FIG. 1 and FIG. 2 show the case in which the housing lower part 13 is attached to the housing casing 12 by means of clamps 14 and brackets 19. To install the filter element 30 or its main element 31 and/or its secondary element 32, the clamps 14 can be declamped from the housing casing 12 so that the housing lower part 13 can be removed from the housing casing 12. In this state, the filter element 30 or its main element 31 and/or its secondary element 32 can be pushed along the first central tube 20 and/or the second central tube 21 into the housing 10 opened from below. The housing lower part 13 can then be attached again to the housing casing 12 by means of the clamps 14.

Figure 3:
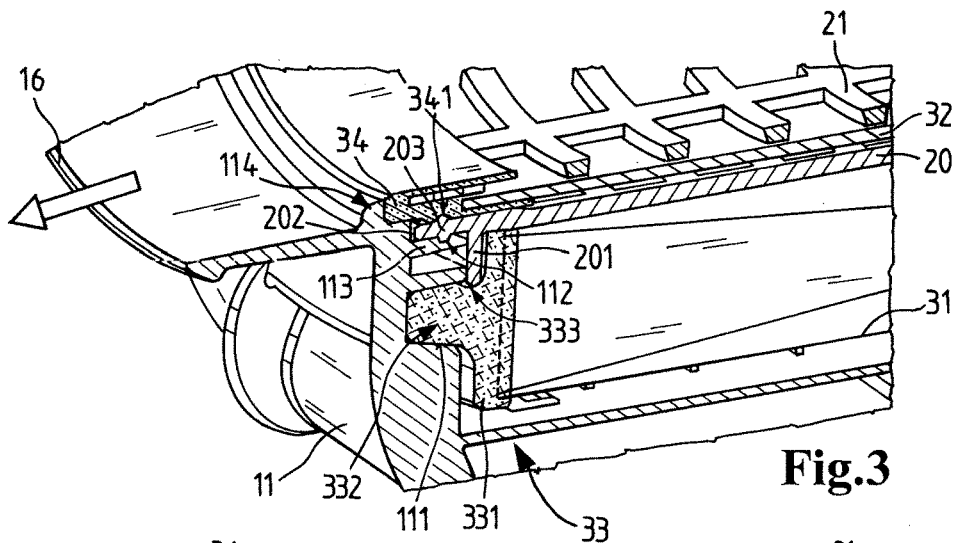
FIG. 3 is a three-dimensional detailed view of the filter element according to the first example of an embodiment.

FIG. 3 shows the main element 31 disposed on the exterior side of the first central tube 20 as well as the secondary element 32 disposed on the interior side of the first central tube 20 and the second central tube 21. The main element 31 has an annular seal 33 with an approximately T-shaped cross section. The seal 33 can also be called main element seal 33. The seal 33 can seal the space between main element 31 and housing upper part 11. The seal realizes a radial form fit. The material used for the seal 33 is foam made of polyurethanes (PU) or PUR foam. The seal 33 is disposed at one end of the annular main element 31. More precisely, the seal 33 is disposed with the crossbeam 331 of the T-shaped seal at the end of the annular main element 31. The line which is vertical with respect to the crossbeam, in other words the foot 332, of the T projects into a recess 111 of the housing upper part 11. The foot 332 of the T forms a projection and can also be called sealing web 332 of the seal 33. Preferably, the seal 33 is attached to the main element 31, for example by gluing. The seal 33 has support surfaces for radially supporting the main element 31 at the housing upper part 11, wherein this means radial in the direction of the tube radius of the annular main element 31. Thus, a radial seal is realized by means of the seal 33. The recess 111 is one part of the space between main element 31 and housing upper part 11 which is to be sealed.

The seal 33 itself may have a recess or undercut 333 into which projects one part of the first central tube 20, a central tube collar 201, or the recess may be formed into the seal 33 by compression of the seal 33 by the central tube collar 201 when installed. The central tube collar 201 is a projection of the central tube 20. The undercut 333 is disposed in FIG. 3 at the transition from foot 332 to crossbeam 331 of the seal 33. The undercut 333 of the seal 33 is adapted to the shape of one end of the central tube collar 201 facing away from the first central tube 20. The undercut 333 and the central tube collar 201 realize, therefore, a form fit. Moreover, the recess 111 of the housing upper part 11 is disposed in such a way that the end of the central tube collar 201 facing away from the first central tube 20 engages into the undercut 333 of the seal 33 when the main element 31 of the filter element 30 is installed in the housing 10 at the first central tube 20.

As a result, the first central tube 20 and the seal 33 engage with each other. To be even more precise, the central tube collar 201 of the first central tube 20 and the undercut 333 of the seal 33 engage with each other. If during maintenance of the cabin filter 1 an old filter element 30 is dismounted from the housing 10 by loosening the interlocking between the first central tube 20 and undercut 333, a new filter element 30 can then be detachably installed. The engagement of the central tube collar 201 into the undercut 333 or its interlocking may be haptically perceived as a snapping sound by the maintenance staff, at least in some embodiments. As a result, the maintenance staff receives a feedback that the main element 31 of the filter element 30 is installed in the correct and therefore safe position in the housing 10.

As can also be seen in FIG. 3, the central tube 20 has moreover at its central tube end 202 facing the housing upper part 11 a protrusion 203 which projects to the interior side of the first central tube 20 and to the exterior side of the first central tube 20. The exterior side of the first central tube 20 faces the seal 33. The interior side of the first central tube 20 faces the secondary element 32 and the second central tube 21. On the one hand, the protrusion 203 projects into a corresponding undercut 112 of the housing upper part 11 which exists in a housing upper part web 113 of the housing 10. On the other hand, the protrusion 203 projects into and may form a corresponding undercut 341 of a seal 34 of the secondary element 32. The shape of the protrusion 203 is adapted to the desired shape of the undercut 112. Thus, the protrusion 203 and the undercut 112 can realize a form fit when the first central tube 20 is installed in the housing 10, as shown in FIG. 3. The shape of the protrusion 203 is also adapted to the shape of the undercut 341. Thus, the protrusion 203 and the undercut 341 can also realize a form fit when the first central tube 20 is installed in the housing 10, as shown in FIG. 3. As a result, the first central tube 20 is interlocked with the housing upper part 11 as well as with the seal 34 of the secondary element 32. As described above, this interlocking is detachable.

The seal 34 can seal the space between secondary element 32 and housing upper part 11. The seal 34 can also be called secondary element seal 34. Foam made of polyurethanes (PU) or PUR foam can be used as material for the seal 34, the same as for seal 33. The seal 34 is disposed at one end of the annular secondary element 31 and abuts a housing upper part projection 114 which is disposed on the interior side of the clean air connection 16. The housing upper part projection 114 forms an axial stop for the seal 34 or the secondary element 32 connected therewith, for example by gluing. Axial means in the direction of the tube axis of the annular secondary element 32.

Figure 4:
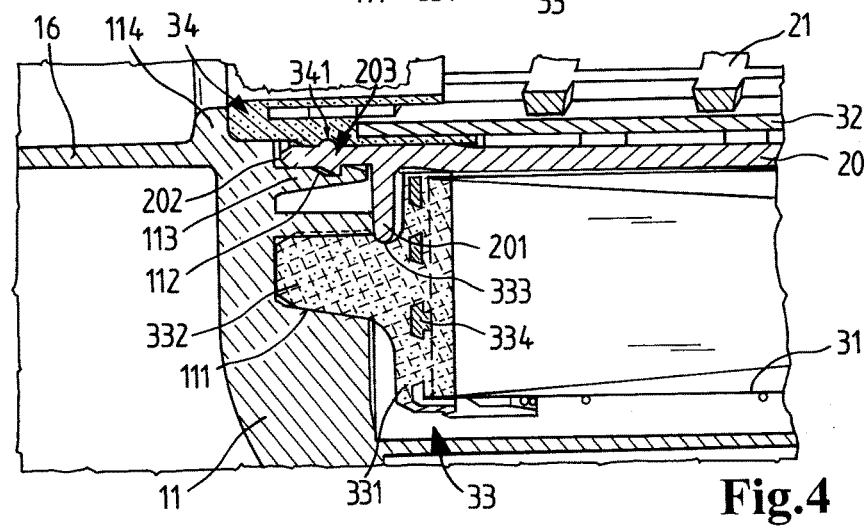
FIG. 4 is a detailed view of the filter element according to a second example of an embodiment.

FIG. 4 shows a similar detailed view, as in FIG. 3, to explain a second example of an embodiment of the filter element 30. The filter 1 and the filter element 30 of the second example of an embodiment are largely identical with the filter 1 and the filter element 30 of the first example of an embodiment. Therefore, only the differences between the first and the second example of an embodiment are described in the following. For the rest, reference is made to the description of the first example of an embodiment.

In contrast to the first example of an embodiment, the filter element of the second example of an embodiment has at least one stiffening ring 334 in the seal 33. As an example, FIG. 4 shows three stiffening rings 334 which are disposed side by side in the seal 33. The ring of the stiffening rings 334 in FIG. 4 is disposed essentially parallel in relation to the crossbeam 331 of the seal 33. The stiffening rings 334 can be made of a harder material than that of the seal 33 such as, for example, hard plastics or metal.

Thanks to one or more stiffening rings, the seal 33 has a higher stiffness against bending.

Figure 5:
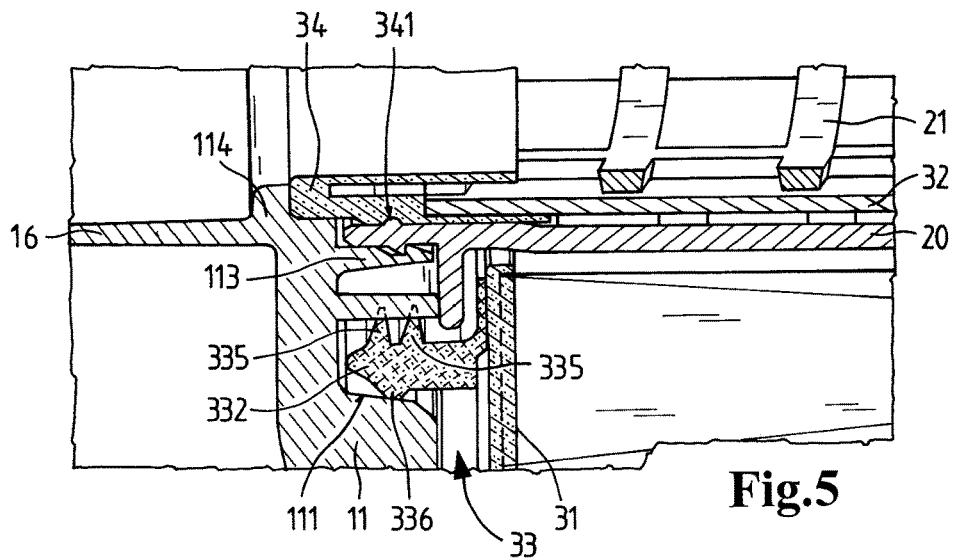
FIG. 5 is a detailed view of a filter element according to a third example of an embodiment which is installed in the filter in FIG. 1.

FIG. 5 shows a similar detailed view, as in FIG. 3, to explain a third example of an embodiment of the filter element 30. The filter 1 and the filter element 30 of the third example of an embodiment are largely identical with the cabin filter 1 and the filter element 30 of the first example of an embodiment. Therefore, only the differences between the first and the third example of an embodiment are described in the following. For the rest, reference is made to the description of the first example of an embodiment.

In contrast to the first example of an embodiment, the seal 33 of the filter element 30 of the third example of an embodiment is a two-component seal. Moreover, the filter element of the third example of an embodiment has two foot prong projections 335 at the foot 332 or the sealing web 332 of the seal 33 at the side facing the first central tube 20 or the secondary element 32. Furthermore, at the foot 332 of the seal 33 is realized a duckfoot bend projection 336 on the side facing the first central tube 20 or the secondary element 32. The dimensions of the complete foot 332 are adapted to the recess 111 of the housing upper part 11, as shown in FIG. 5. As a result, the foot 332 of the third example of an embedment shown in FIG. 5 can also realize a form fit with the recess 111 of the housing upper part 11, even if the form fit is in this case not as distinctive as it is with the form fits of the first and second examples of an embodiment. The foot 332 can interlock with the recess 111 of the housing upper part 11 which causes a haptic perception when installing the filter element 30 in the housing 10.

Figure 6:
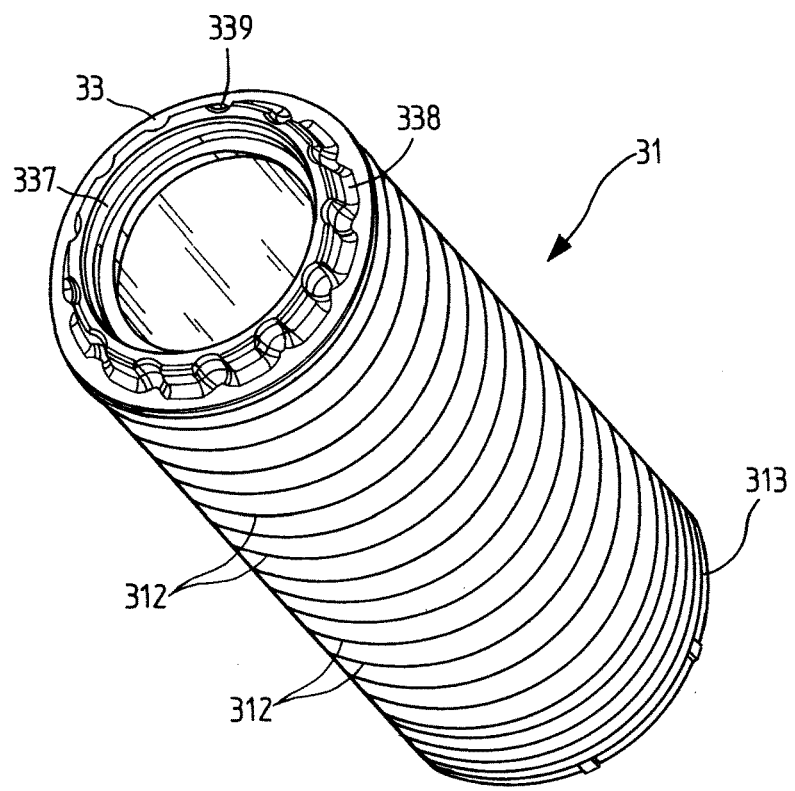
FIG. 6 is a three-dimensional view of a main filter element of the filter element according to a fourth example of an embodiment.

FIG. 6 shows a main element 31 of the filter element 30 according to a fourth example of an embodiment in a three-dimensional overall view. The filter 1 and the filter element 30 of the fourth example of an embedment are largely identical with the filter 1 and the filter element 30 of the first, second or third example of an embodiment. Therefore, only the differences between the fourth and the other examples of an embodiment are described in the following. For the rest, reference is made to the description of the first to the third example of an embodiment.

The main element 31 in FIG. 6 is a hollow-cylindrical body which features at its external circumference several rings 312 which, for the sake of clarity, do not all have a reference numeral in FIG. 6. At the bottom in FIG. 6, the main element 31 is completed by a base ring 313. The seal 33 is disposed at the end of the main element 31 opposing the base ring 313. The seal 33 has an inside sealing line 337 on the interior side of the main element 31 and a sealing web exterior side 338 of the foot 332 or the sealing web 332. Up to this point, the main element 31 is not different from the main element 31 of the first, second or third example of an embodiment.

Figure 7:
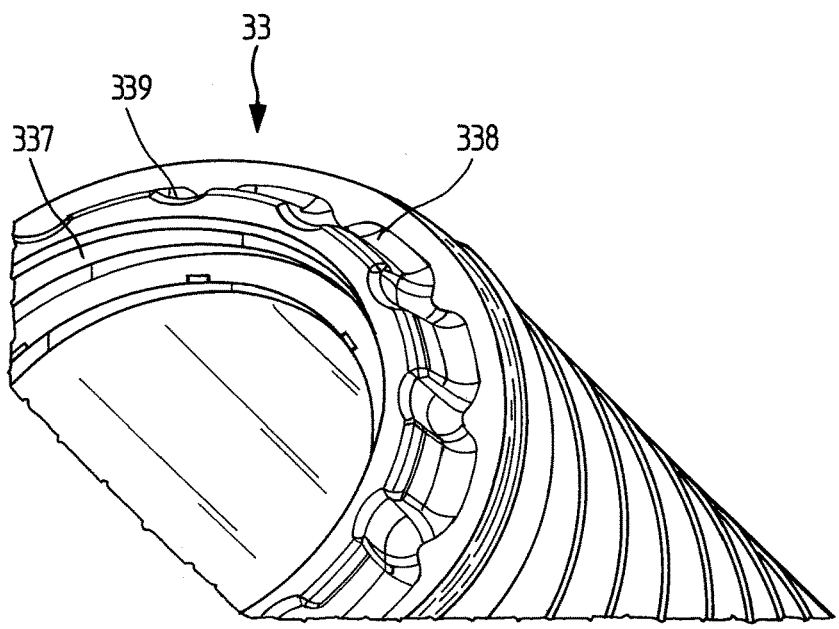
FIG. 7 is a three-dimensional detailed view of the main filter element of the filter element in FIG. 6.

In this example of an embodiment, however, the seal 33 has in contrast to the first, second or third example of an embodiment a plurality of notches 339 which, for the sake of clarity, do not all have a reference numeral in FIG. 6. The notches 339 are disposed side by side along the circumference of the sealing web 332. FIG. 7 shows the shape of the seal 33 with the notches 339 in enlarged detail.

The sealing exterior side 338 of the seal 33 is meant to generate a contact pressure to the sealing surface when the main element 31 is being installed or installed in the housing 10. The notches 339 reduce the pressure or the mechanical resistance which can be perceived during the installation of the main element 31. Because of the notches 339, the seal 33 is in fact non-confined or sandwiched in the recess 111 of the housing upper part. Instead, the sealing web 332 of the seal 33 of the main element 31 can escape into the free spaces formed by the notches 339 or fill them by deforming. As a result, a sufficient sealing effect can, however, be realized by means of the seal 33. However, when mounting the main element 31, less mounting force has to be applied than without notches 339. The reason for this is that less material is to be compressed radially.

Figure 8:
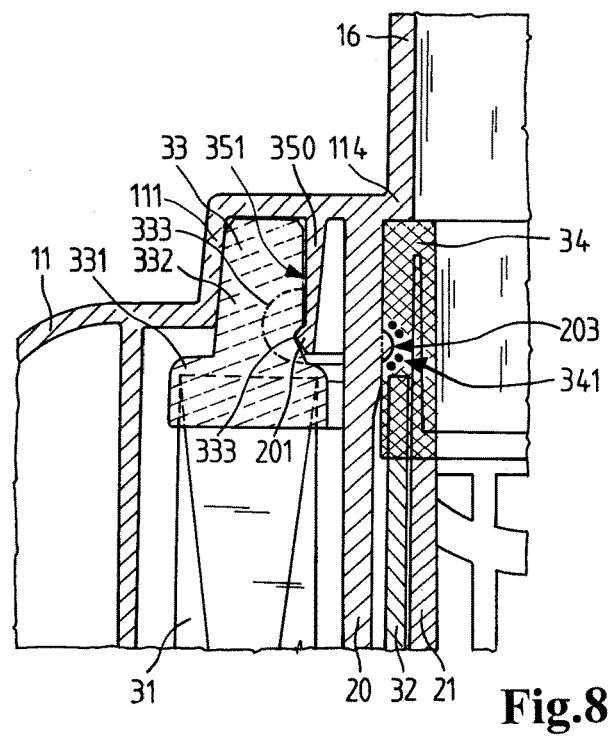
FIG. 8 is a detailed view of an air filter system according to a fifth example of an embodiment.
Figure 9:
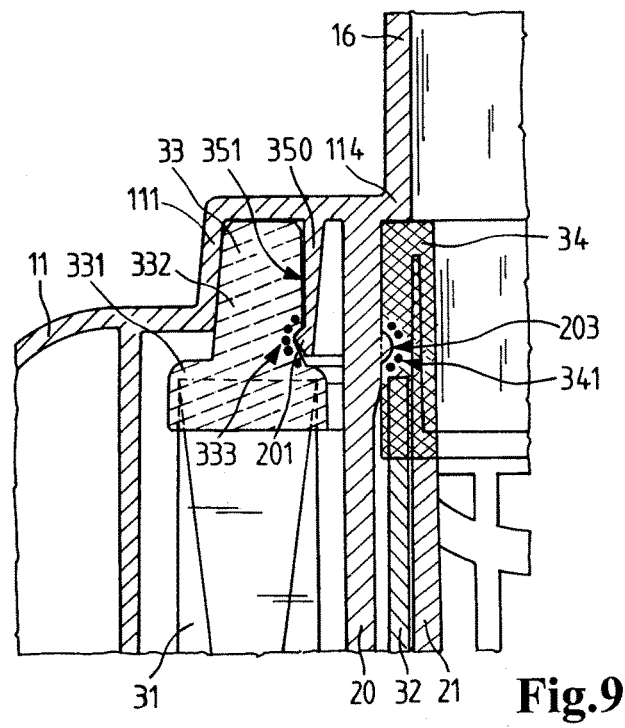
FIG. 9 is a detailed view of an air filter system according to a sixth example of an embodiment.

In FIGS. 8 and 9 are shown further examples of an embodiment similar to the examples of an embodiment according to FIGS. 3 and 4. The embodiments according to FIGS. 8 and 9 are different from the examples of an embodiment according to FIGS. 3 and 4 insofar that the first central tube 20 is firmly and undetachably connected with the housing upper part 11. This can, for example, be realized by a one-piece design in plastic injection molding or by a welded joint. A radially inwardly extending bulge 203 each which protrudes to the interior side of the first central tube 20 is disposed at the central tube 20. The interior side of the first central tube 20 faces the secondary element 32 and the second central tube 21. The bulge 203 engages into a corresponding undercut 341 of a seal 34 of the secondary element 32 which is realized in the shown examples of an embodiment by an elastic deformation of the seal 34. However, the undercut 341 can also be provided as radial groove in the seal 34, as described above.

The seal 34 can seal the space between secondary element 32 and housing upper part 11. The seal 34 can also be called secondary element seal 34. Foam made of polyurethanes (PU) or PUR foam can be used as material for the seal 34, the same as for seal 33. The seal 34 is disposed at one end of the annular secondary element 32 and abuts a housing upper part projection 114 which is disposed on the interior side of the clean air connection 16. The housing upper part projection 114 forms an axial stop for the seal 34 or the secondary element 32 connected therewith, for example by gluing. Axial means in the direction of the tube axis of the annular secondary element 32. Radially outside of the central tube 20 is disposed an annular web 350 with a circular cylindrical sealing surface 351 at the housing upper part 11 which features at its end extending into the interior space of the housing 10 a radially outwardly extending bulge 203 which engages into an undercut 333 of the seal 33. FIG. 8 shows two variants of the undercut, wherein the cross section of the smaller undercut corresponds to the cross section of the bulge 203 and thus tightly encloses the surface of the undercut 333 when the main filter element 31 is installed. The dashed representation of the variant of the undercut 333 features in inner surface which is spaced from the surface of the undercut 333 when the main filter element 31 is installed in such a way that a gap is formed between bulge 203 and undercut 333. In the variant shown in FIG. 9, the undercut 333 is formed by an elastic deformation of the seal 33 (dotted representation).

All examples of an embodiment of the filter 1, the filter element 30 and the housing 10 described above can be used individually or in all possible combinations. In this connection, the following characteristics are conceivable.

Other geometries and dimensions for the filter element 30 as those depicted and described can be chosen insofar as the conditions at the installation site of the filter element 30 have to be taken into account and a detachable, haptically perceivable installation of the filter element 30 in the housing 10 is possible.

Instead of an undercut in the seals 33, 34, the seal 33 and/or the seal 34 can also feature a projection or a bulge which engages into an undercut of the housing upper part 11 or of the first central tube 20. However, the variant of the form fit described in the examples of an embodiment between the seals 33, 34 and housing 10 is preferred for stability reasons.

Foil can also be used as material for the seal 33. Likewise, foil can also be used as material for the seal 34.

The number of notches 339 at the seal 33 can be chosen as appropriate. Only one notch 339 can also be provided. As an alternative, more notches 339 than shown in FIG. 6 can also be provided.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An air filter system comprising:
    an air filter element including
        a filter media;
        an annular seal having a contact zone configured to form a friction grip to hold the filter element, the annular seal arranged on an axial end of the filter media including:
            a radially extending cross beam arranged directly on the axial end of the filter media;
            an axially outwardly extending elastic sealing web or foot formed on an axially outer side of the cross beam and extending axially outwardly away from the axial end of the filter media and cross beam; and
            a flat cylindrical sealing surface formed on a radially inner or outer side of the axially outwardly extending elastic sealing web or foot and spaced axially outwardly away from the radially extending cross beam;
            wherein the sealing surface of the annular seal is arranged axially outwardly away from the radially extending cross beam;
    a housing including
        a housing upper part;
        a clean air connection for discharging clean air from the housing;
        a sealing receptacle sealably engaging against and mounting the radial acting seal of the filter element in a form-fitting tight-fit connection, the sealing receptacle spaced away from the radially extending cross beam of the annular seal, the sealing receptacle formed on an interior wall of the housing;
        wherein the form-fitting connection mountably holds the air filter element to the housing;
    wherein the housing upper part includes
        the sealing receptacle having a cylindrical extending sealing surface extending from the upper housing part;

wherein the cylindrical extending sealing surface encloses the clean air connection;

wherein the cylindrical extending sealing surface receives the sealing surface of the annular seal of the air filter element;

an annular projection arranged in the housing and protruding radially over the sealing surface of the sealing receptacle and arranged on and at the sealing surface of the sealing receptacle, the annular projection enclosed by the radial acting seal of the air filter element in a form-fitting manner;

wherein the form-fitting tight-fit connection is provided by the radial projection engaging radially against and pressing radially into the contact zone, elastically compressing the annular seal to radially compress annular seal to form a friction grip by forming a radial groove into the annular seal when the filter element is installed in the housing, providing the form-fitting tight-fit connection mountably holding the air filter element to the housing, wherein the cylindrical extending sealing surface of the sealing receptacle is spaced axially away from the radially extending groove formed into the annular seal.

2. The air filter system according to claim 1, wherein a through-flowable central tube is disposed in the housing coaxial to and as a continuation of the clean air connection, the through-flowable central tube supporting the air filter element;

wherein the central tube is either detachably installable into the housing or made unitary in one piece with the housing upper part of the housing.

3. The air filter system according to claim 1, further comprising an axially extending central tube, the central tube having openings for radial flow through a circumferential wall of the central tube, the central tube having an annular collar extending radially outwardly from the central tube, a radial outer side of the annular collar forming the annular projection which forms the radial groove into the annular seal when the filter element when the filter element is in an installed state;

wherein the annular projection is arranged at an axially inner end of a radially inner wall of the sealing receptacle and protrudes radially outwardly over the axially inner end of the radially inner wall of the sealing receptacle;

wherein the central tube collar is firmly connected with the central tube, made in one piece of the same material with the central tube or abutting against the sealing surface.

4. The air filter system according to claim 1, wherein the sealing surface is formed radially outside or inside at a cylindrical collar projecting from the housing upper part into the interior space of the housing.

5. The air filter system according to claim 1, wherein the sealing receptacle is formed into and by the upper housing part by an annular recess or groove in the housing radially surrounding the clean air connection;

wherein the sealing receptacle formed by the housing has a radially outer wall and a radially inner wall defining a "U"-shaped sealing receptacle into which the axially outwardly extending sealing web or foot of the filter element is received and radially sealed to the housing.

6. The air filter system according to claim 5, wherein the sealing surface is formed by the radially inner or radially outer wall of the recess or groove;

wherein the sealing surface of the radially inner or radially outer wall of the recess or groove is cylindrical.

7. The air filter system according to claim 1, wherein the central tube is designed in such a way that a seal of the air filter element at the central tube is detachably attached by interlocking engagement or that the central tube is detachably attached by interlocking engagement at the housing upper part.

8. The air filter system according to claim 1, wherein the annular projection forms a circumferentially closed ring; or wherein the annular projection is a ring that is interrupted regularly or irregularly around its' circumference.

9. The air filter system according to claim 2, wherein the air filter element is a main filter element;

the air filter system further comprising a secondary filter element, which is disposed downstream of the main filter element in flow direction of the air;

wherein the main filter element is arranged on and attached on the outside of the central tube; and wherein the secondary filter element is arranged within an interior of the central tube when the main air filter element and secondary air filter element are detachably installed in the housing.

10. The air filter system according to claim 9, wherein the main filter element wherein the annular seal securely holds the main filter element onto the housing upper part or at the central tube;

wherein the annular seal seals a space arranged between the main element and housing upper part when the main filter element is detachably installed in the housing; and the secondary filter element includes a seal for securely holding the secondary filter element onto the housing upper part or at the central tube;

wherein the secondary filter element seal seals a space arranged between the secondary element and the housing upper part when the secondary filter element is detachably installed in the housing.

11. A filter housing for receiving an air filter element, the filter housing comprising:

a housing upper part;

a clean air connection for discharging clean air from the housing;

an annular sealing receptacle formed as an annular U-shaped groove formed into an interior wall of the filter housing, the annular groove opening in an axial direction, wherein the annular sealing receptacle includes a cylindrical extending sealing surface extending axially from the upper housing part;

wherein the cylindrical extending sealing surface surrounds and encloses the clean air connection;

wherein the cylindrical extending sealing surface is configured to receive an annular seal of the air filter element;

a central tube is disposed in the filter housing as a continuation of the clean air connection, the central tube of the filter housing sized for being received into the air filter element during installation of the air filter element into the filter housing and to support the air filter element relative to the filter housing;

wherein the central tube is detachably installed into the filter housing or made unitary in one piece with the filter housing;

wherein the central tube has an annular collar extending radially outwardly from a radially outer side of the central tube, a radial outer side of the annular collar forming an annular projection which protrudes radially over the cylindrical extending sealing surface of the U-shaped groove formed into the interior wall of the filter housing;

the annular projection and annular sealing receptacle configured to form a form-fitting tight-fit connection with the annular seal of the air filter element during installation of the air filter element in the filter housing, by radially compressing an annular region of the annular seal to form a annular groove into which the annular projection is received.

12. The filter housing according to claim 11, wherein the annular projection forms a circumferentially closed ring; or wherein the annular projection is a ring that is interrupted regularly or irregularly around its' circumference.

\* \* \* \* \*